(12) United States Patent
Sasaki

(10) Patent No.: US 6,504,686 B1
(45) Date of Patent: Jan. 7, 2003

(54) THIN-FILM MAGNETIC HEAD INCLUDING A NON-MAGNETIC LAYER FOR REDUCING NOISE IN A REPRODUCING HEAD, AND METHOD OF MANUFACTURING SAME

(75) Inventor: Yoshitaka Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 179 days.

(21) Appl. No.: 09/659,710

(22) Filed: Sep. 11, 2000

(30) Foreign Application Priority Data

Oct. 12, 1999 (JP) .......................................... 11-290292

(51) Int. Cl.⁷ ................................................ G11B 5/39
(52) U.S. Cl. ...................................... 360/317; 360/319
(58) Field of Search ................................ 360/317, 319, 360/126

(56) References Cited

U.S. PATENT DOCUMENTS

| | | | | |
|---|---|---|---|---|
| 5,812,350 A | * | 9/1998 | Chen et al. ................ | 360/126 |
| 5,850,325 A | * | 12/1998 | Miyauchi et al. .......... | 360/126 |
| 5,872,691 A | * | 2/1999 | Fukuyama et al. ......... | 360/319 |
| 6,278,590 B1 | * | 8/2001 | Gill et al. ................... | 360/317 |
| 6,292,334 B1 | * | 9/2001 | Koike et al. ................ | 360/319 |
| 6,346,338 B1 | * | 2/2002 | Watanabe et al. .......... | 428/692 |
| 6,385,015 B2 | * | 5/2002 | Narumi et al. ............. | 360/319 |
| 6,396,670 B1 | * | 5/2002 | Murdock .................... | 360/319 |
| 6,404,601 B1 | * | 6/2002 | Rottmayer et al. ......... | 360/317 |

* cited by examiner

*Primary Examiner*—Jefferson Evans
(74) *Attorney, Agent, or Firm*—Oliff & Berridge, PLC

(57) ABSTRACT

A reproducing head has a bottom shield layer, an MR element and a top shield layer (bottom pole layer). The recording head has: the bottom pole layer (top shield layer) and a top pole layer that include pole portions; and a recording gap layer placed between these pole portions. The recording head further has a thin-film coil placed between the bottom and top pole layers. The top shield layer includes a first layer and a second layer. The first layer is located to face toward the thin-film coil. The second layer forms the pole portion. A nonmagnetic layer is provided in the first layer between the MR element and the pole portion of the top shield layer. The length of the nonmagnetic layer between an end thereof located in an air bearing surface and the other end is greater than the length of the MR element between an end thereof located in an air bearing surface and the other end.

26 Claims, 14 Drawing Sheets

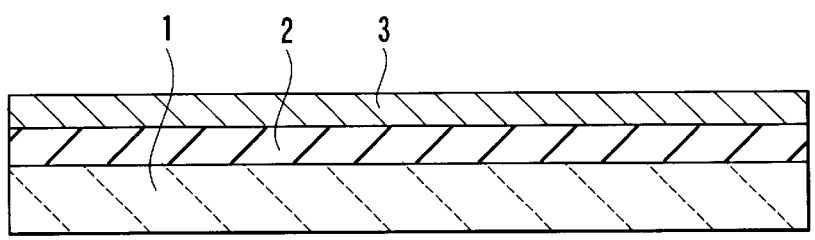 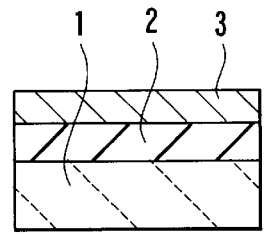
FIG. 1A  FIG. 1B
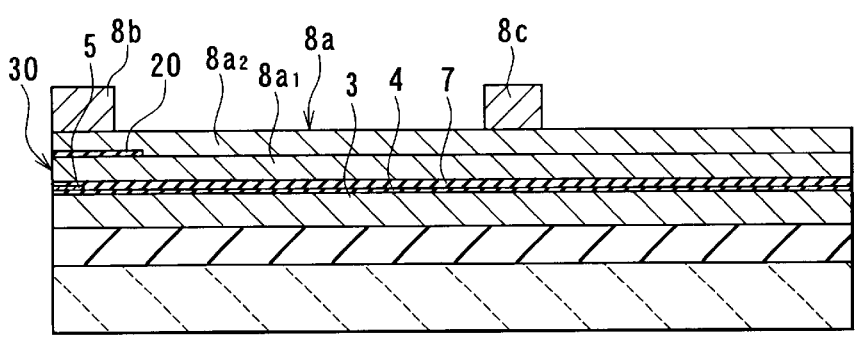 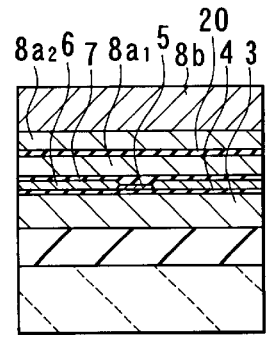
FIG. 2A  FIG. 2B

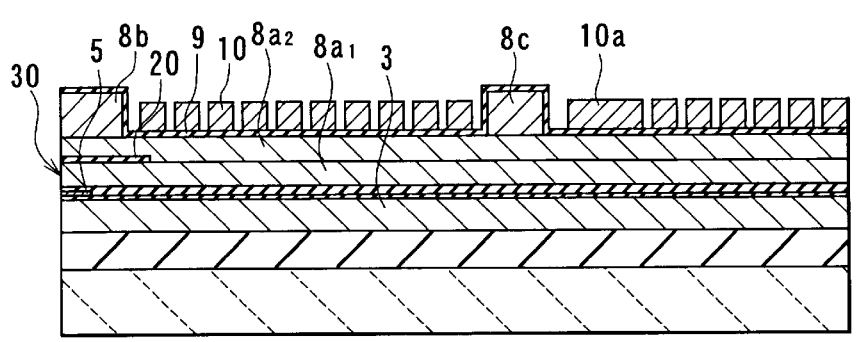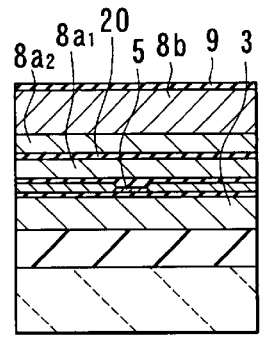
FIG. 3A  FIG. 3B
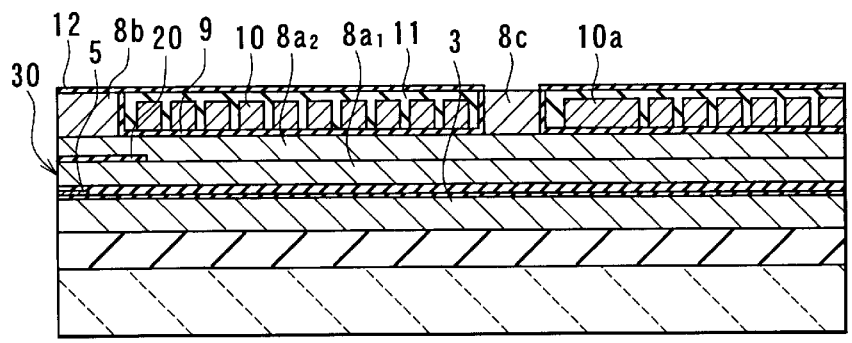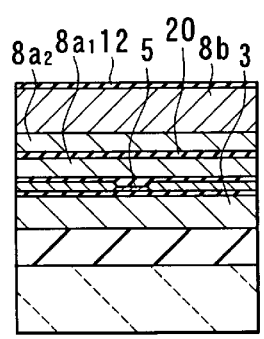
FIG. 4A  FIG. 4B

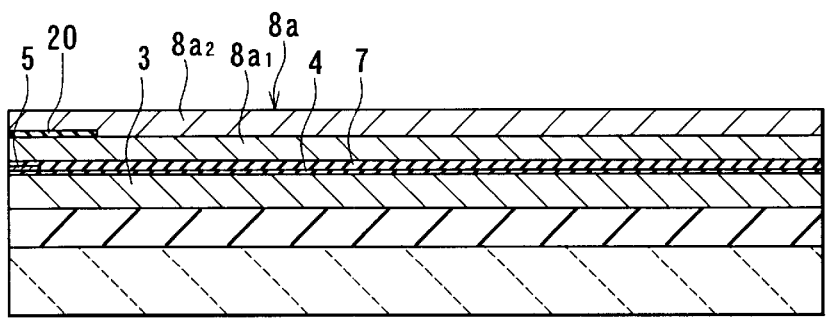 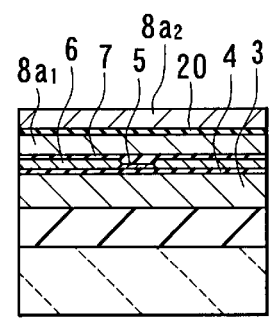
FIG. 10A  FIG. 10B
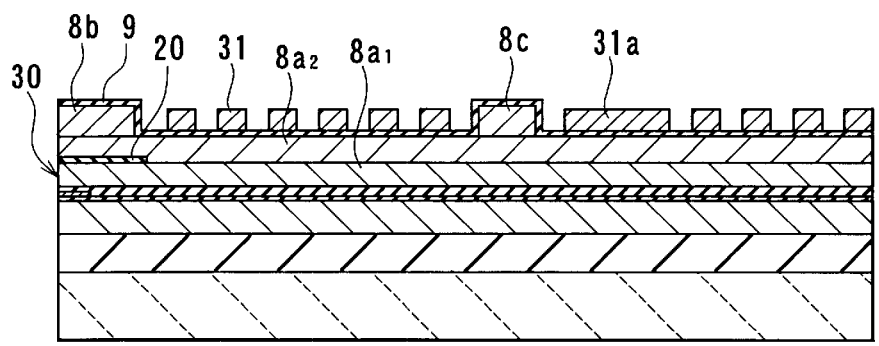 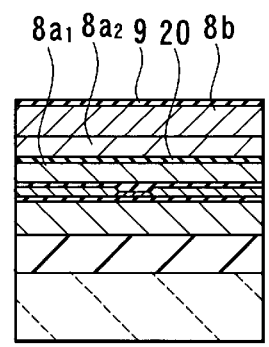
FIG. 11A  FIG. 11B

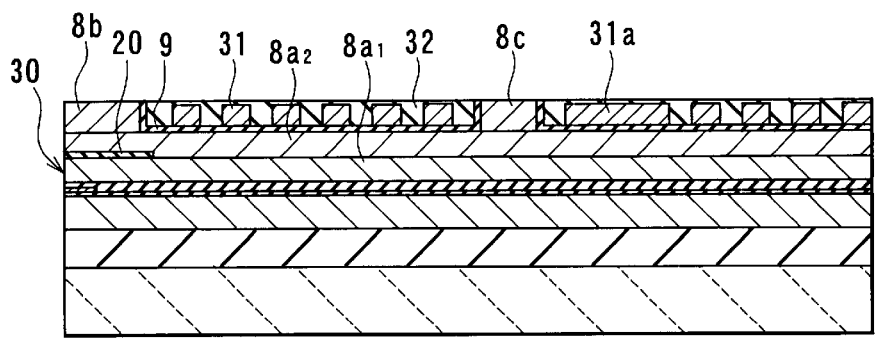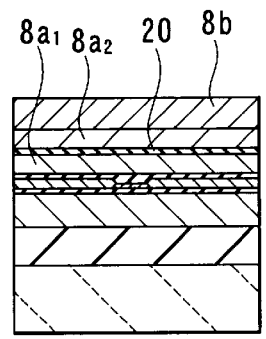
FIG. 12A          FIG. 12B
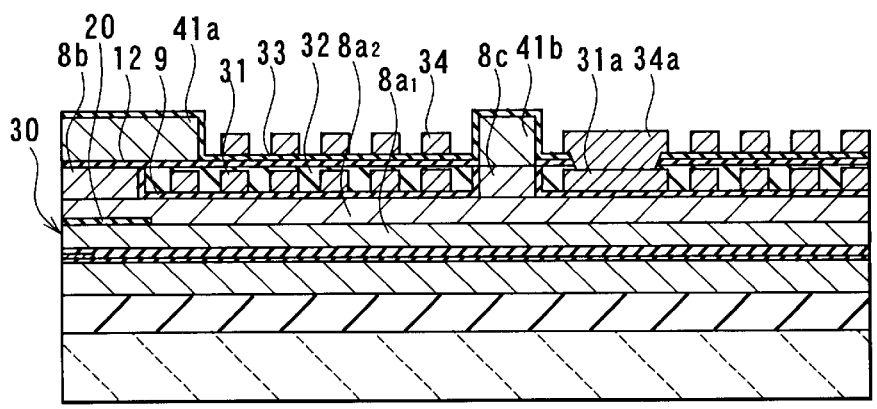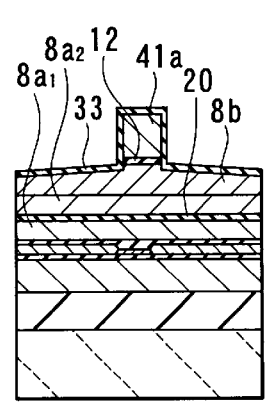
FIG. 13A          FIG. 13B

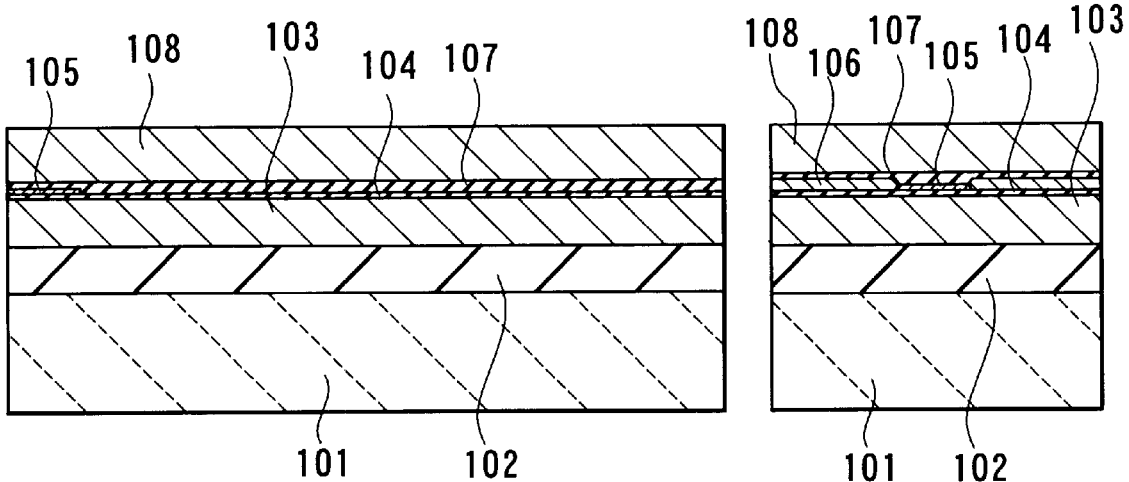
FIG. 16A
RELATED ART
FIG. 16B
RELATED ART
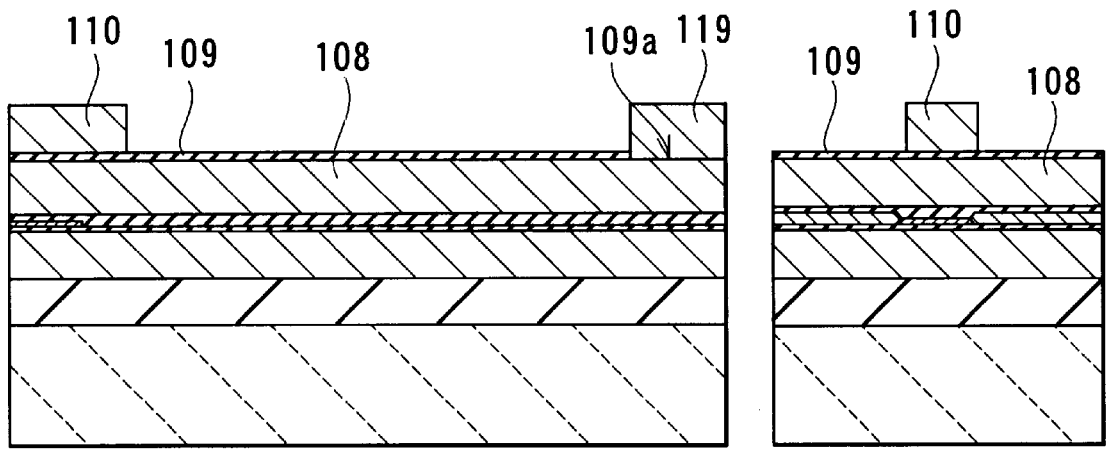
FIG. 17A
RELATED ART
FIG. 17B
RELATED ART

THIN-FILM MAGNETIC HEAD INCLUDING A NON-MAGNETIC LAYER FOR REDUCING NOISE IN A REPRODUCING HEAD, AND METHOD OF MANUFACTURING SAME

BACKGROUND OF THE INVENTION

1. Field of the Invention

The present invention relates to a composite thin-film magnetic head comprising a reproducing head and a recording head and to a method of manufacturing such a thin-film magnetic head.

2. Description of the Related Art

Performance improvements in thin-film magnetic heads have been sought as surface recording density of hard disk drives has increased. Such thin-film magnetic heads include composite thin-film magnetic heads that have been widely used. A composite head is made of a layered structure including a recording head having an induction-type magnetic transducer for writing and a reproducing head having a magnetoresistive (MR) element for reading.

It is required to increase the track density on a magnetic recording medium in order to increase recording density among the performance characteristics of a recording head. To achieve this, it is required to implement a recording head of a narrow track structure wherein a track width, that is, the width of top and bottom poles sandwiching the recording gap layer measured in the air bearing surface, is reduced down to microns or the submicron order. Semiconductor process techniques are utilized to implement such a structure.

Reference is now made to FIG. 16A to FIG. 19A and FIG. 16B to FIG. 19B to describe an example of a method of manufacturing a composite thin-film magnetic head as an example of a related-art method of manufacturing a thin-film magnetic head. FIG. 16A to FIG. 19A are cross sections each orthogonal to an air bearing surface of the head. FIG. 16B to FIG. 19B are cross sections of a pole portion of the head each parallel to the air bearing surface.

In the manufacturing method, as shown in FIG. 16A and FIG. 16B, an insulating layer 102 made of alumina ($Al_2O_3$), for example, and having a thickness of about 5 to 10 $\mu$m is deposited on a substrate 101 made of aluminum oxide and titanium carbide ($Al_2O_3$—TiC), for example. On the insulating layer 102 a bottom shield layer 103 made of a magnetic material is formed for making a reproducing head.

Next, on the bottom shield layer 103, alumina, for example, is deposited to a thickness of 100 to 200 nm through sputtering to form a bottom shield gap film 104 as an insulating layer. On the bottom shield gap film 104 an MR element 105 for reproduction having a thickness of tens of nanometers is formed. Next, a pair of electrode layers 106 are formed on the bottom shield gap film 104. The electrode layers 106 are electrically connected to the MR element 105.

Next, a top shield gap film 107 is formed as an insulating layer on the bottom shield gap film 104 and the MR element 105. The MR element 105 is embedded in the shield gap films 104 and 107.

Next, on the top shield gap film 107, a top-shield-layer-cum-bottom-pole-layer (called a bottom pole layer in the following description) 108 having a thickness of about 3 $\mu$m is formed. The bottom pole layer 108 is made of a magnetic material and used for both a reproducing head and a recording head.

Next, as shown in FIG. 17A and FIG. 17B, on the bottom pole layer 108, a recording gap layer 109 made of an insulating film such as an alumina film whose thickness is 0.2 $\mu$m is formed. Next, a portion of the recording gap layer 109 is etched to form a contact hole 109a to make a magnetic path. On the recording gap layer 109 in the pole portion, a top pole tip 110 made of a magnetic material and having a thickness of 0.5 to 1.0 $\mu$m is formed for the recording head. At the same time, a magnetic layer 119 made of a magnetic material is formed for making the magnetic path in the contact hole 109a for making the magnetic path.

Next, as shown in FIG. 18A and FIG. 18B, the recording gap layer 109 and the bottom pole layer 108 are etched through ion milling, using the top pole tip 110 as a mask. As shown in FIG. 18B, the structure is called a trim structure wherein the sidewalls of the top pole portion (the top pole tip 110), the recording gap layer 109, and a part of the bottom pole layer 108 are formed vertically in a self-aligned manner.

Next, an insulating layer 111 made of an alumina film, for example, and having a thickness of about 3 $\mu$m is formed on the entire surface. The insulating layer 111 is then polished to the surfaces of the top pole tip 110 and the magnetic layer 119 and flattened.

Next, on the flattened insulating layer 111, a first layer 112 of a thin-film coil is made of copper (Cu), for example, for the induction-type recording head. Next, a photoresist layer 113 is formed into a specific shape on the insulating layer 111 and the first layer 112. Heat treatment is then performed at a specific temperature to flatten the surface of the photoresist layer 113. On the photoresist layer 113, a second layer 114 of the thin-film coil is then formed. Next, a photoresist layer 115 is formed into a specific shape on the photoresist layer 113 and the second layer 114. Heat treatment is then performed at a specific temperature to flatten the surface of the photoresist layer 115.

Next, as shown in FIG. 19A and FIG. 19B, a top pole layer 116 is formed for the recording head on the top pole tip 110, the photoresist layers 113 and 115, and the magnetic layer 119. The top pole layer 116 is made of a magnetic material such as Permalloy. Next, an overcoat layer 117 of alumina, for example, is formed to cover the top pole layer 116. Finally, lapping of the slider is performed to form the air bearing surface 118 of the thin-film magnetic head including the recording head and the reproducing head. The thin-film magnetic head is thus completed.

FIG. 20 is a top view of the thin-film magnetic head shown in FIG. 19A and FIG. 19B. The overcoat layer 117 and the other insulating layers and insulating films are omitted in FIG. 20.

In FIG. 19A, 'TH' indicates the throat height and 'MR-H' indicates the MR height. The throat height is the length (height) of the pole portions, that is, the portions of the two magnetic pole layers facing each other with the recording gap layer in between, the length between the air-bearing-surface-side end and the other end. The MR height is the length (height) between the air-bearing-surface-side end of the MR element and the other end. In FIG. 19B, 'P2W' indicates the pole width, that is, the track width of the recording head (hereinafter called the recording track width). In addition to the factors such as the throat height and the MR height, the apex angle as indicated with θ in FIG. 19A is one of the factors that determine the performance of a thin-film magnetic head. The apex is a hill-like raised portion of the coil covered with the photoresist layers 113 and 115. The apex angle is the angle formed between the top surface of the insulating layer 111 and the straight line drawn through the edges of the pole-side lateral walls of the apex.

As the reproducing output of the reproducing head increases, noise such as Barkhausen noise increases, and variations in output increase, with regard to the composite thin-film magnetic head wherein the bottom pole layer of the recording head also functions as the top shield layer of the reproducing head as shown in FIG. 19A and FIG. 19B, the composite head being capable of attaining surface recording density as high as 20 gigabits per square inches or 30 gigabits per square inches. A variation in output may be represented by COV (%), that is, a value obtained by dividing the standard deviation of the output by the mean value of the output, the standard deviation being obtained by measuring the output 100 consecutive times, and multiplying the result by 100. In this case, a variation in output is great if the COV is great.

One of the factors that cause an increase in noise and an increase in output variation of the reproducing head as mentioned above is residual magnetism and variations therein that are produced in the recording head capable of attaining high surface recording density, as the recording head performs recording.

OBJECT AND SUMMARY OF THE INVENTION

It is an object of the invention to provide a thin-film magnetic head and a method of manufacturing the same for reducing noise and output variations in a reproducing head that result from the writing operation of a recording head.

A thin-film magnetic head of the invention comprises a medium facing surface that faces toward a recording medium, a reproducing head, and a recording head. The reproducing head includes: a magnetoresistive element; and a first shield layer and a second shield layer for shielding the magnetoresistive element, portions of the shield layers located on a side of the medium facing surface being opposed to each other with the magnetoresistive element in between. The recording head includes: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The second shield layer functions as the first magnetic layer, too. The thin-film magnetic head further comprises a nonmagnetic layer located in the second shield layer and between the magnetoresistive element and the pole portion of the second shield layer, the nonmagnetic layer having an area greater than an area of the magnetoresistive element.

A method of the invention is provided for manufacturing a thin-film magnetic head comprising a medium facing surface that faces toward a recording medium, a reproducing head, and a recording head. In the thin-film magnetic head the reproducing head includes: a magnetoresistive element; and a first shield layer and a second shield layer for shielding the magnetoresistive element, portions of the shield layers located on a side of the medium facing surface being opposed to each other with the magnetoresistive element in between. The recording head includes: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers. The second shield layer functions as the first magnetic layer, too.

The method of the invention includes the steps of forming the reproducing head; forming the recording head; and forming a nonmagnetic layer in the second shield layer and between the magnetoresistive element and the pole portion of the second shield layer, the nonmagnetic layer having an area greater than an area of the magnetoresistive element.

According to the thin-film magnetic head or the method of manufacturing the same of the invention, the nonmagnetic layer is provided in the second shield layer and between the magnetoresistive element and the pole portion of the second shield layer. The nonmagnetic layer reduces the effect of residual magnetism produced in the recording head on the magnetoresistive element.

According to the thin-film magnetic head or the method of manufacturing the same of the invention, the second shield layer may include: a first layer located to face toward the at least part of the coil; and a second layer including one of the pole portions and connected to a surface of the first layer that faces toward the gap layer.

According to the thin-film magnetic head or the method of manufacturing the same of the invention, the nonmagnetic layer may be located between the first layer and the second layer.

According to the thin-film magnetic head or the method of manufacturing the same of the invention, the second layer may include a portion for defining a throat height. In this case, the portion for defining the throat height may have a length between an end thereof located in the medium facing surface and the other end, the length being greater than a length of the nonmagnetic layer between an end thereof located in the medium facing surface and the other end.

According to the thin-film magnetic head or the method of manufacturing the same of the invention, the thin-film coil may include a portion located on a side of the second layer. In this case, an insulating layer may be further provided. This insulating layer covers the at least part of the thin-film coil located on the side of the second layer, wherein a surface of the insulating layer facing toward the gap layer is flattened together with a surface of the second layer facing toward the gap layer.

According to the thin-film magnetic head or the method of manufacturing the same of the invention, the second magnetic layer may be made up of one layer.

According to the thin-film magnetic head or the method of manufacturing the same of the invention, the second magnetic layer may include: a pole portion layer including one of the pole portions that defines a track width; and a yoke portion layer forming a yoke portion and connected to the pole portion layer.

According to the thin-film magnetic head or the method of manufacturing the same of the invention, the yoke portion layer may have an end face that faces toward the medium facing surface, the end face being located at a distance from the medium facing surface.

According to the thin-film magnetic head or the method of manufacturing the same of the invention, the pole portion layer may have a length between an end thereof located in the medium facing surface and the other end, the length being greater than a length of the magnetoresistive element between an end thereof located in the medium facing surface and the other end.

According to the thin-film magnetic head or the method of manufacturing the same of the invention, the thin-film coil may include a portion located on a side of the pole portion layer. In this case, an insulating layer may be further provided. This insulating layer covers the portion of the coil located on the side of the pole portion layer and has a surface facing toward the yoke portion layer, the surface being flattened together with a surface of the pole portion layer facing toward the yoke portion layer.

Other and further objects, features and advantages of the invention will appear more fully from the following description.

BRIEF DESCRIPTION OF THE DRAWINGS

FIG. 1A and FIG. 1B are cross sections for illustrating a step in a method of manufacturing a thin-film magnetic head of a first embodiment of the invention.

FIG. 2A and FIG. 2B are cross sections for illustrating a step that follows FIG. 1A and FIG. 1B.

FIG. 3A and FIG. 3B are cross sections for illustrating a step that follows FIG. 2A and FIG. 2B.

FIG. 4A and FIG. 4B are cross sections for illustrating a step that follows FIG. 3A and FIG. 3B.

FIG. 10A and FIG. 10B are cross sections for illustrating a step in a method of manufacturing a thin-film magnetic head of a third embodiment of the invention.

FIG. 11A and FIG. 11B are cross sections for illustrating a step that follows FIG. 10A and FIG. 10B.

FIG. 12A and FIG. 12B are cross sections for illustrating a step that follows FIG. 11A and FIG. 11B.

FIG. 13A and FIG. 13B are cross sections for illustrating a step that follows FIG. 12A and FIG. 12B.

FIG. 16A and FIG. 16B are cross sections for illustrating a step in a method of manufacturing a thin-film magnetic head of related art.

FIG. 17A and FIG. 17B are cross sections for illustrating a step that follows FIG. 16A and FIG. 16B.

DETAILED DESCRIPTION OF THE PREFERRED EMBODIMENTS

Figures 5A, 5B:
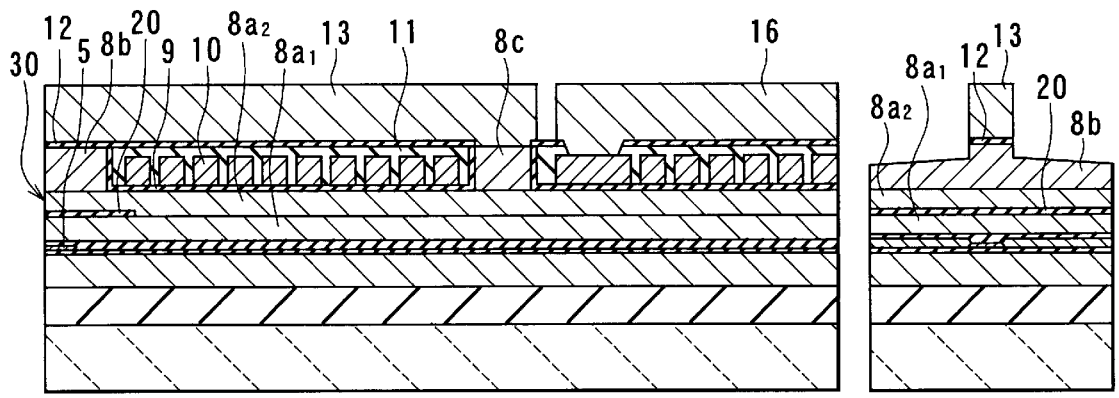
FIG. 5A and FIG. 5B are cross sections for illustrating a step that follows FIG. 4A and FIG. 4B.

Preferred embodiments of the invention will now be described in detail with reference to the accompanying drawings.

First Embodiment

Reference is now made to FIG. 1A to FIG. 6A, FIG. 1B to FIG. 6B, and FIG. 7 and FIG. 8 to describe a thin-film magnetic head and a method of manufacturing the same of a first embodiment of the invention. FIG. 1A to FIG. 6A are cross sections each orthogonal to an air bearing surface. FIG. 1B to FIG. 6B are cross sections of the pole portion each parallel to the air bearing surface.

In the manufacturing method, as shown in FIG. 1A and FIG. 1B, an insulating layer 2 made of alumina ($Al_2O_3$), for example, whose thickness is about 5 $\mu$m, is deposited on a substrate 1 made of aluminum oxide and titanium carbide ($Al_2O_3$—TiC), for example. On the insulating layer 2 a bottom shield layer 3 made of a magnetic material such as Permalloy and having a thickness of about 3 $\mu$m is formed for making a reproducing head. The bottom shield layer 3 is formed through plating selectively on the insulating layer 2 with a photoresist film as a mask, for example. Next, although not shown, an insulating layer of alumina, for example, having a thickness of 4 to 5 $\mu$m, for example, is formed over the entire surface. This insulating layer is polished through chemical mechanical polishing (CMP), for example, so that the bottom shield layer 3 is exposed, and the surface is flattened.

Next, as shown in FIG. 2A and FIG. 2B, on the bottom shield layer 3, a bottom shield gap film 4 having a thickness of about 20 to 40 nm, for example, is formed as an insulating film. On the bottom shield gap film 4, an MR element 5 for reproduction having a thickness of tens of nanometers is formed. An end of the MR element 5 is located in the air bearing surface 30, that is, the medium facing surface that faces toward a recording medium. The MR element 5 may be fabricated through selectively etching an MR film formed through sputtering. The MR element 5 may be an element made of a magnetosensitive film exhibiting a magnetoresistivity, such as an AMR element, a GMR element, or a tunnel magnetoresistive (TMR) element. Next, on the bottom shield gap film 4, a pair of electrode layers 6 having a thickness of tens of nanometers are formed. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. An insulating material used for the shield gap films 4 and 7 may be any of alumina, aluminum nitride, diamond-like carbon (DLC), and so on. The shield gap films 4 and 7 may be fabricated through sputtering or chemical vapor deposition (CVD). If the shield gap films 4 and 7 made of alumina films are fabricated through CVD, materials used are trimethyl aluminum ($Al(CH_3)_3$) and $H_2O$, for example. Through the use of CVD, it is possible to make the thin and precise shield gap films 4 and 7 with few pinholes.

Next, on the top shield gap film 7, a first layer 8a of a top-shield layercum-bottom-pole-layer (called a top shield layer in the following description) 8 is selectively formed. The top shield layer 8 is made of a magnetic material and used for both a reproducing head and a recording head. The top shield layer 8 is made up of a second layer 8b and a third layer 8c described later, in addition to the first layer 8a. The first layer 8a is located to face toward at least a part of a thin-film coil described later.

In this embodiment a nonmagnetic layer 20 made of a nonmagnetic material is located in the first layer 8a of the top shield layer 8 between the MR element 5 and the pole portion of the top shield layer 8. Therefore, the first layer 8a and the nonmagnetic layer 20 are formed as follows. On the top shield gap film 7 a lower layer portion $8a_1$ of the first layer 8a having a thickness of about 1.0 to 1.5 μm, for example, is formed. Next, the nonmagnetic layer 20 made of a nonmagnetic material having a thickness of about 0.3 to 0.6 μm, for example, is formed on the lower layer portion 8a, and above the MR element 5. The nonmagnetic layer 20 has an area greater than that of the MR element 5. That is, an end of the nonmagnetic layer 20 is located in the air bearing surface 30, and the length of the nonmagnetic layer 20 between this end and the other end is greater than the length of the MR element 5 between an end located in the air bearing surface 30 and the other end. The width of the nonmagnetic layer 20 is greater than that of the MR element 5. The nonmagnetic material used for the nonmagnetic layer 20 may be an inorganic insulating material such as alumina, or may be a conductive nonmagnetic material such as tungsten or molybdenum. Next, an upper layer portion $8a_2$ of the first layer 8a having a thickness of about 1.0 to 1.5 μm, for example, is formed on the lower layer portion 8a, and the nonmagnetic layer 20.

Next, the second layer 8b and the third layer 8c of the top shield layer 8, each having a thickness of about 1.5 to 2.5 μm, are formed on the first layer 8a. The second layer 8b makes up a pole portion of the top shield layer 8 and is connected to a surface of the first layer 8a that faces toward a recording gap layer described later (on the upper side of the drawings). The third layer 8c is provided for connecting the first layer 8a to a top pole layer described later, and is located near the center of the thin-film coil described later. The throat height is defined by the position of an end of a portion of the second layer 8b opposite to the air bearing surface 30. This portion of the second layer 8b faces toward the top pole layer. That is, this portion of the second layer 8b is the portion that defines the throat height. The zero throat height position (the position of an end of the pole portion opposite to the air bearing surface) is the position of the end of this portion of the second layer 8b.

The second layer 8b and the third layer 8c of the top shield layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, as shown in FIG. 3A and FIG. 3B, an insulating film 9 of alumina, for example, is formed over the entire surface. The thickness of the insulating film 9 is about 0.3 to 0.6 μm.

Next, a photoresist is patterned through a photolithography process to form a frame (not shown) for making the thin-film coil through frame plating. Next, the thin-film coil 10 made of copper (Cu), for example, is formed by frame plating through the use of the frame. For example, the thickness of the coil 10 is about 1.0 to 2.0 μm and the pitch is 1.2 to 2.0 μm. The frame is then removed. In the drawings numeral 10a indicates a portion for connecting the thin-film coil 10 to a conductive layer (lead) described later.

Next, as shown in FIG. 4A and FIG. 4B, an insulating layer 11 of alumina, for example, having a thickness of about 3 to 4 μm is formed over the entire surface. The insulating layer 11 is then polished through CMP, for example, until the second layer 8b and the third layer 8c of the top shield layer 8 are exposed, and the surface is flattened. Although the thin-film coil 10 is not exposed in FIG. 4A, the coil 10 may be exposed.

Next, a recording gap layer 12 made of an insulating material whose thickness is 0.2 to 0.3 μm, for example, is formed on the second layer 8b and the third layer 8c of the top shield layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD. If the recording gap layer 12 made of an alumina film is fabricated through CVD, materials used are trimethyl aluminum (Al(CH$_3$)$_3$)and H$_2$O, for example. Through the use of CVD, it is possible to make the thin and precise gap layer 12 with few pinholes.

Next, a portion of the recording gap layer 12 located on top of the third layer 8c is etched to form a contact hole for making the magnetic path. Portions of the recording gap layer 12 and the insulating layer 11 located on top of the connecting portion 10a of the coil 10 are etched to form a contact hole.

Next, as shown in FIG. 5A and FIG. 5B, on the recording gap layer 12, the top pole layer 13 having a thickness of about 2.0 to 3.0 μm is formed in a region extending from the air bearing surface 30 to the portion on top of the third layer 8c of the top shield layer 8. In addition, the conductive layer 16 having a thickness of about 2.0 to 3.0 μm is formed. The conductive layer 16 is connected to the portion 10a of the thin-film coil 10. The top pole layer 13 is in contact with and magnetically coupled to the third layer 8c of the top shield layer 8 through the contact hole formed in the portion on top of the third layer 8c.

The top pole layer 13 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used. In order to improve the high frequency characteristic, the top pole layer 13 may be made up of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as BCl$_2$ or Cl$_2$, or a fluorine-base gas such as CF$_4$ or SF$_6$, for example. Next, the second layer 8b of the top shield layer 8 is selectively etched by about 0.3 to 0.6 μm through argon ion milling, for example. A trim structure as shown in FIG. 5B is thus formed. The trim structure suppresses an increase in the effective track width due to expansion of a magnetic flux generated during writing in a narrow track.

Figures 6A, 6B:
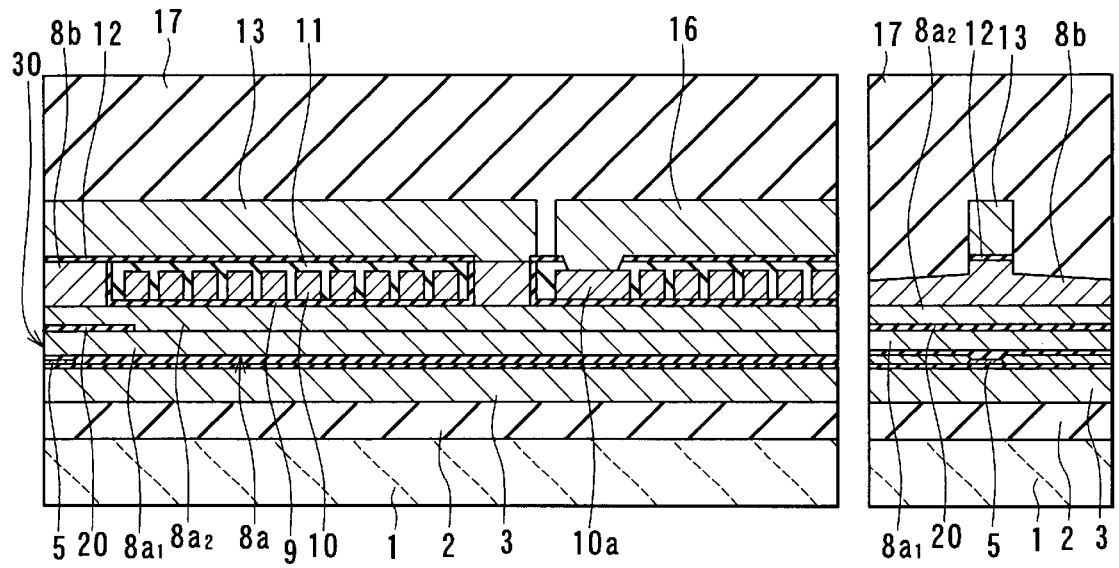
FIG. 6A and FIG. 6B are cross sections of the thin-film magnetic head of the first embodiment.

Next, as shown in FIG. 6A and FIG. 6B, an overcoat layer 17 of alumina, for example, having a thickness of 20 to 40 μm is formed over the entire surface. The surface of the overcoat layer 17 is then flattened and pads (not shown) for electrodes are formed on the overcoat layer 17. Finally, lapping of the slider including the foregoing layers is performed to form the air bearing surface 30 of the thin-film magnetic head including the recording head and the reproducing head. The thin-film magnetic head of the embodiment is thus completed.

In this embodiment the bottom shield layer 3 corresponds to the first shield layer of the invention. The top shield layer 8 made up of the first layer 8a, the second layer 8b and the third layer 8c corresponds to the second shield layer of the invention. The top pole layer 13 corresponds to the second magnetic layer of the invention. Since the top shield layer 8 also functions as the bottom pole layer, the top shield layer 8 corresponds to the first magnetic layer of the invention, too.

Figure 7:
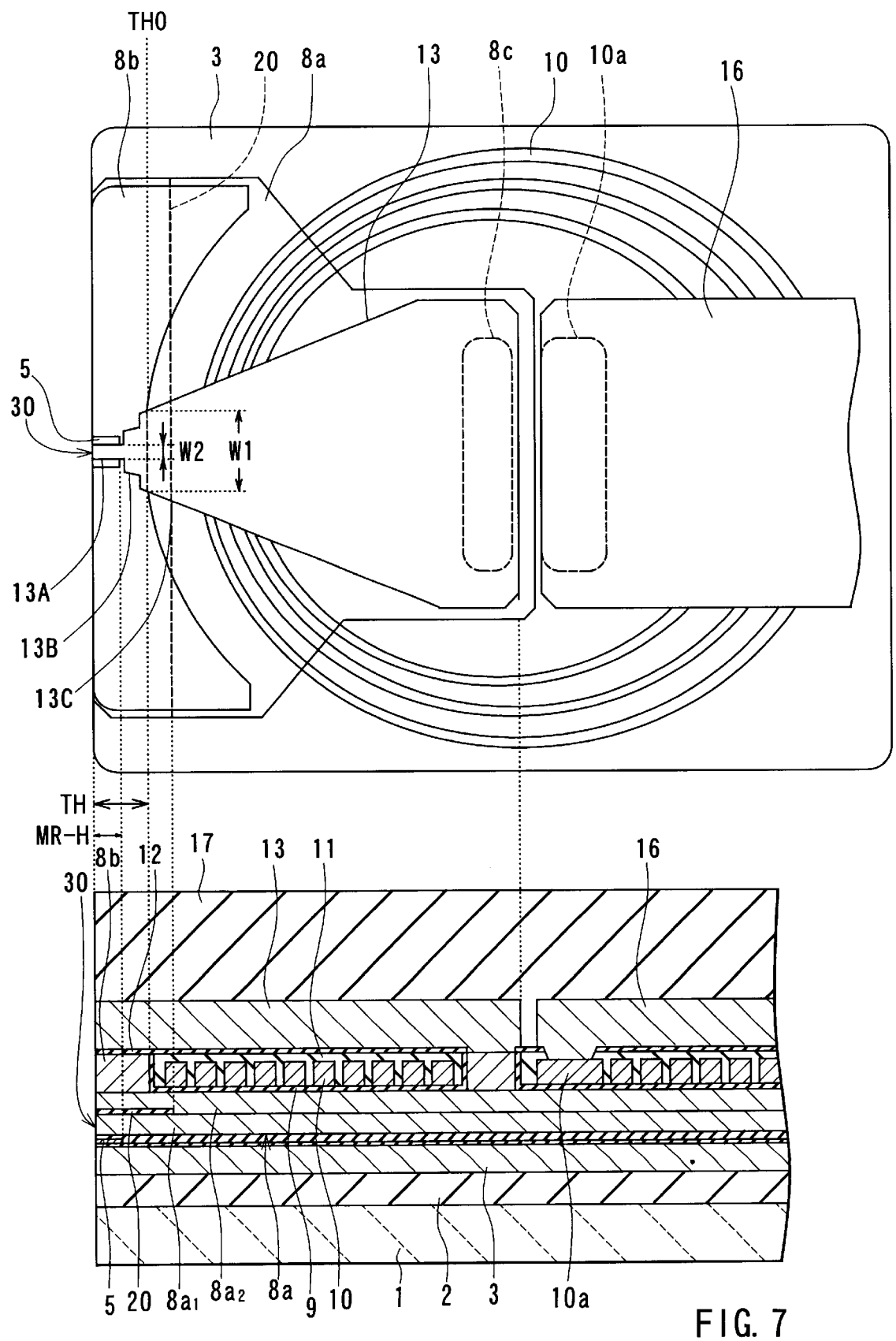
FIG. 7 is an explanatory view for illustrating the relationship between a top view of the main part of the thin-film magnetic head of the first embodiment and a cross-sectional view thereof.

FIG. 7 is an explanatory view for illustrating the relationship between a top view (an upper view of FIG. 7) of the main part of the thin-film magnetic head of the embodiment and a cross-sectional view (a lower view of FIG. 7) thereof The overcoat layer 17 and the other insulating layers and films are omitted in FIG. 7. In FIG. 7 'TH' indicates the throat height, 'THO' indicates the zero throat height position, and 'MR-H' indicates the MR height.

Figure 8:
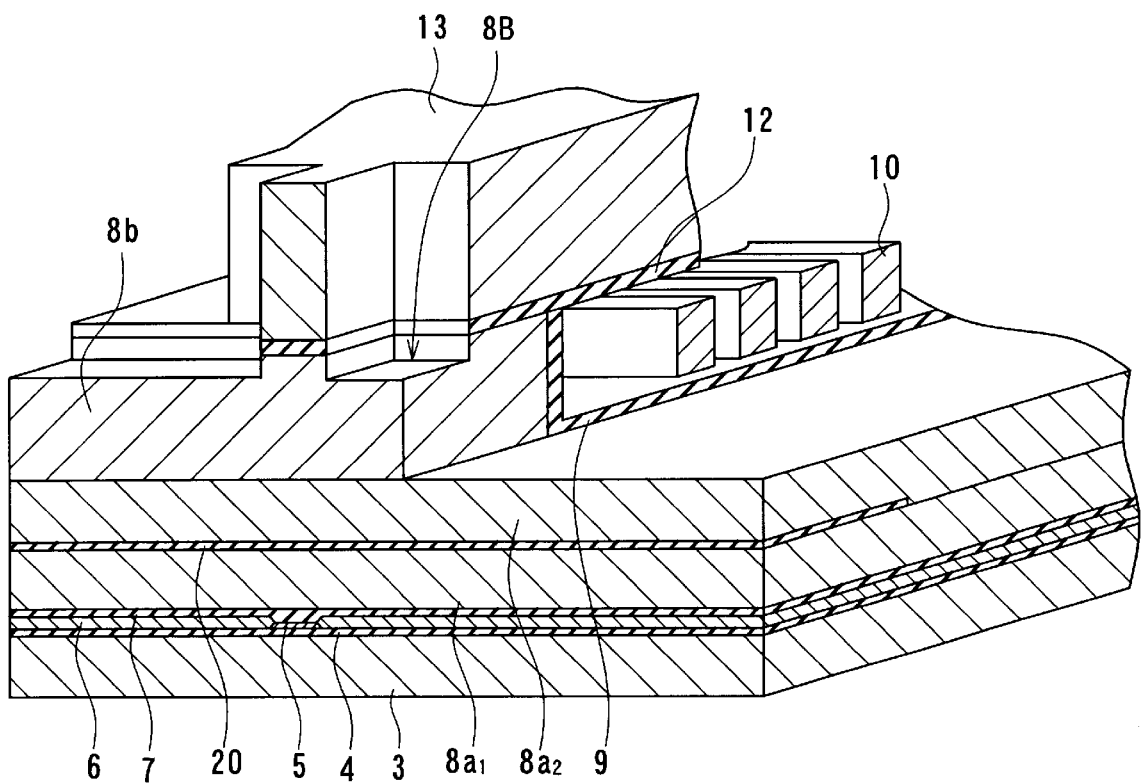
FIG. 8 is a perspective view of the main part of the thin-film magnetic head of the first embodiment, a part of which is cut away.

FIG. 8 is a perspective view of portions of the thin-film magnetic head of the embodiment including the layers from the bottom shield layer 3 to the top pole layer 13, a part of which is cut away. In FIG. 8 numeral 8B indicates a portion of the second layer 8b etched to make the trim structure.

As described so far, the thin-film magnetic head of the embodiment comprises the medium facing surface (air bearing surface 30) facing toward a recording medium, the reproducing head and the recording head. The reproducing head has: the MR element 5; and the bottom shield layer 3 and the top shield layer (bottom pole layer) 8 for shielding the MR element 5. Portions of the bottom shield layer 3 and the top shield layer 8 facing toward the air bearing surface 30 are opposed to each other, the MR element 5 being placed between these portions.

The recording head has the bottom pole layer (the top shield layer 8) and the top pole layer 13 magnetically coupled to each other, each of which includes at least one layer. The bottom pole layer and the top pole layer 13 include the pole portions opposed to each other and placed in regions on a side of the air bearing surface 30. The recording head further has: the recording gap layer 12 placed between the pole portion of the bottom pole layer and the pole portion of the top pole layer 13; and the thin-film coil 10 a part of which is placed between the bottom pole layer and the top pole layer 13, the part of the coil 10 being insulated from the bottom pole layer and the top pole layer 13.

In this embodiment the top shield layer 8 includes: the first layer 8a located in a region facing toward at least a part of the thin-film coil 10; and the second layer 8b connected to a surface of the first layer 8a that faces toward the recording gap layer 12 (the upper side of the accompanying cross-sectional views). The second layer 8b includes the pole portion and defines the throat height. The coil 10 is located on a side of the second layer 8b (on the right side of the accompanying cross-sectional views).

In this embodiment the nonmagnetic layer 20 having an area greater than that of the MR element 5 is provided. The nonmagnetic layer 20 is located in the first layer 8a of the top shield layer 8 and between the MR element 5 and the pole portion of the top shield layer.

In this embodiment throat height TH is the length of the portion of the second layer 8b of the top shield layer 8 that defines the throat height, the length between an end of the portion located in the air bearing surface 30 and the other end. (This length may be simply called the length of the second layer 8b in the following description.) Throat height TH is greater than MR height MR-H, that is, the length of the MR element 5 between an end thereof located in the air bearing surface 30 and the other end. The length of the second layer 8b is preferably 150 to 600 percent of MR height MR-H, and more preferably 300 to 500 percent. In other words, if MR height MR-H is 0.5 μm, for example, the length of the second layer 8b is preferably 0.75 to 3.0 μm, and more preferably 1.5 to 2.5 μm.

In the embodiment the portion of the second layer 8b that faces toward the top pole layer 13 has an end opposite to the air bearing surface 30, this end having the shape of a straight line parallel to the air bearing surface 30. The other part of the second layer 8b has an end located farther from the air bearing surface 30, the end being in the shape of an arc that approximates to the shape of the perimeter of the thin-film coil 10. Since the portion of the second layer 8b that faces toward the top pole layer 13 has the end having the above-described shape in this embodiment, it is possible to control the throat height and the zero throat height position with accuracy.

In the embodiment the track width is defined by the top pole layer 13. As shown in FIG. 7, the top pole layer 13 has a first portion 13A, a second portion 13B and a third portion 13C in the order in which the closest to the air bearing surface 30 comes first. The first portion 13A has a width equal to the recording track width. The second portion 13B is greater than the first portion 13A in width. The third portion 13C is greater than the second portion 13B in width.

The width of the third portion 13C gradually decreases toward the air bearing surface 30. It is preferred that each of lateral edges of a portion of the third portion 13C having a varying width forms an angle of 30 to 60 degrees with respect to the direction orthogonal to the air bearing surface 30, each of the lateral edges being located at each end of the width of the third portion 13C. The width of the second portion 13B gradually decreases toward the air bearing surface 30, too.

In the top pole layer 13 there are edges linking lateral edges of the first portion 13A orthogonal to the air bearing surface 30 to lateral edges of the second portion 13B located at ends of the width of the second portion 13B. These edges linking the lateral edges of the first portion 13A to the lateral edges of the second portion 13B are parallel to the air bearing surface 30. Similarly, the top pole layer 13 has edges linking the lateral edges of the second portion 13B to the lateral edges of the third portion 13C. These edges linking the lateral edges of the second portion 13B to the lateral edges of the third portion 13C are parallel to the air bearing surface 30.

In the top pole layer 13 the interface between the first portion 13A and the second portion 13B is located near the zero MR height position (the position of an end of the MR element 5 opposite to the air bearing surface 30).

In the top pole layer 13 the interface between the second portion 13B and the third portion 13C (the position near the stepped portions between the portion 13B and the portion 13C shown in FIG. 7) is located closer to the air bearing surface 30 (that is, on the left side of FIG. 7) than zero throat height position THO, that is, the position of an end of the portion of the second layer 8b that faces toward the top pole layer 13, the end being opposite to the air bearing surface 30 (on the right side of FIG. 7). As a result, in this embodiment, width W1 of the top pole layer 13 at zero throat height position THO is greater than recording track width W2, that is, the width of the first portion 13A.

According to the embodiment thus described, the nonmagnetic layer 20 is provided in the thin-film magnetic head wherein the top shield layer 8 of the reproducing head functions as the bottom pole layer of the recording head, too. The nonmagnetic layer 20 has an area greater than that of the MR element 5 and is located in the top shield layer 8 and between the MR element 5 and the pole portion of the top shield layer 8. As a result, the nonmagnetic layer 20 reduces the effect of the residual magnetism produced in the recording head on the MR element 5. It is thereby possible to reduce noise such as Barkhausen noise in the reproducing head resulting from the writing operation of the recording head, and to reduce variations in output represented by COV (%), for example.

According to the embodiment, the throat height is defined by the second layer 8b of the top shield layer 8. The thin-film coil 10 is located on the first layer 8a of the top shield layer 8 and on a side of the second layer 8b. The top surface of the insulating layer 11 covering the coil 10 is flattened, together with the top surface of the second layer 8b. As a result, the top pole layer 13 that defines the recording track width is formed on the flat surface. Therefore, according to the embodiment, it is possible to form the top pole layer 13 with accuracy and to precisely control the recording track width even if the recording track width is reduced down to the half-micron or quarter-micron order.

According to the embodiment, the width of the top pole layer 13 in the zero throat height position is greater than the recording track width. It is thereby possible to prevent a magnetic flux from saturating near the zero throat height position. In addition, the width of the top pole layer 13 gradually decreases toward the air bearing surface 30. Therefore, it is impossible that the cross-sectional area of the magnetic path abruptly decreases. Saturation of a magnetic flux halfway through the magnetic path is thereby prevented. According to the embodiment, it is thereby possible to utilize the magnetomotive force generated by the thin-film coil 10 for writing with efficiency and to improve the overwrite property.

According to the embodiment, the top pole layer 13 that defines the recording track width is formed on the flat surface. As a result, it is possible to prevent an increase in the width of the first portion 13A that defines the recording track width when the width of the top pole layer 13 in the zero throat height position is made greater than the recording track width as described above. If the top pole layer is formed on the apex, the width of the portion of the top pole layer that defines the recording track width is likely to increase, too, when the width of the top pole layer in the zero throat height position is made greater than the recording track width.

In the embodiment an end of the second portion 13B of the top pole layer 13 on a side of the air bearing surface 30 is parallel to the air bearing surface 30. The first portion 13A of the top pole layer 13 is coupled to this end of the second portion 13B. Therefore, a photomask used for making the top pole layer 13 through photolithography has a shape including a side corresponding to the end of the second portion 13B on the side of the air bearing surface 30 and an additional concave or convex portion corresponding to the first portion 13A. Whether the portion corresponding to the first portion 13A is concave or convex depends on whether a negative photomask or a positive photomask is used. The top pole layer 13 is formed on the flat surface through the use of the photomask in the above-described shape. It is thereby possible to precisely control the width of the first portion 13A, that is, the recording track width.

According to the embodiment, the throat height is defined by the second layer 8b of the top shield layer 8. The length of the second layer 8b is greater than MR height MR-H, that is, the length of the MR element 5 between the end thereof located in the air bearing surface 30 and the other end. As a result, the areas of the first layer 8a and the second layer 8b touching each other are made greater. It is thereby possible to prevent a magnetic flux from saturating in those areas.

The greater the length of the second layer 8b than MR height MR-H, the greater are the areas of the first layer 8a and the second layer 8b touching each other. Therefore, if the difference between the length of the second layer 8b and MR height MR-H is small, the effect of preventing saturation of the flux is reduced, and the degree of an improvement in overwrite property is reduced. On the other hand, if the length of the second layer 8b is too great, the yoke length is made greater and the overwrite property is reduced, conversely. Therefore, there is a range of the preferred length of the second layer 8b. To be specific, the length of the second layer 8b is preferably 150 to 600 percent of MR height MR-H, and more preferably 300 to 500 percent, as mentioned above.

According to the embodiment as thus described, it is possible to precisely control the recording track width and to prevent a magnetic flux from saturating halfway through the magnetic path even if the recording track width is reduced.

In the embodiment the thin-film coil 10 is located on a side of the second layer 8b of the top shield layer 8 and formed on the flat insulating film 9. It is thereby possible to form the thin-film coil 10 of small dimensions with accuracy. Furthermore, according to the embodiment, it is possible that an end of the coil 10 is placed near the zero throat height position, that is, near the end of the second layer 8b opposite to the air bearing surface 30, since no apex exists.

As thus described, according to the embodiment, the yoke length is reduced by about 30 to 40 percent of that of a prior-art head, for example. As a result, it is possible to utilize a magnetomotive force generated by the thin-film coil 10 for writing with efficiency. It is therefore possible to provide a thin-film magnetic head having a recording head with an excellent high frequency characteristic, an excellent nonlinear transition shift (NLTS) characteristic and an excellent overwrite property.

According to the embodiment, a reduction in yoke length is achieved. As a result, it is possible to greatly reduce the entire length of the thin-film coil 10 without changing the number of turns of the coil. The resistance of the coil 10 is thereby reduced. It is therefore possible to reduce the thickness of the coil 10.

According to the embodiment, the insulating film 9 is provided between the second layer 8b of the top shield layer 8 and the thin-film coil 10. The insulating film 9 is thin and made of an inorganic material that achieves sufficient insulation strength. High insulation strength is thereby obtained between the second layer 8b and the coil 10.

In the embodiment the thin-film coil 10 is covered with the insulating layer 11 made of an inorganic insulating material. It is thereby possible to prevent the pole portion from protruding toward a recording medium due to expansion resulting from heat generated around the coil 10 when the thin-film magnetic head is used.

Second Embodiment

Figure 9:
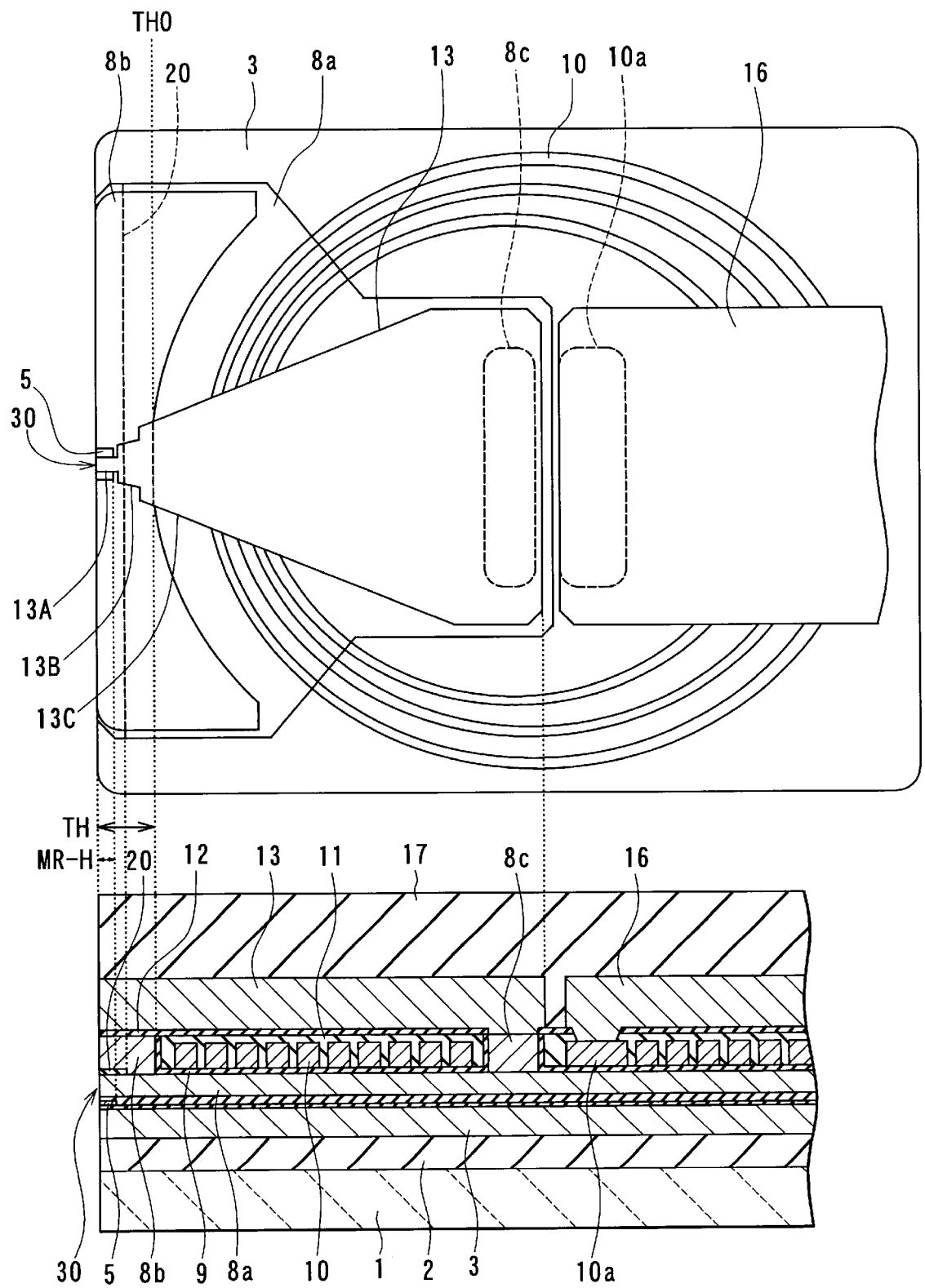
FIG. 9 is an explanatory view for illustrating the relationship between a top view of the main part of the thin-film magnetic head of a second embodiment of the invention and a cross-sectional view thereof.

Reference is now made to FIG. 9 to describe a thin-film magnetic head and a method of manufacturing the same of a second embodiment of the invention. FIG. 9 is an explanatory view for illustrating the relationship between a top view (an upper view of FIG. 9) of the main part of the thin-film magnetic head of the embodiment and a cross-sectional view (a lower view of FIG. 9) thereof. In FIG. 9 the overcoat layer 17 and the other insulating layers and films are omitted. In FIG. 9 'TH' indicates the throat height, 'THO' indicates the zero throat height position, and 'MR-H' indicates the MR height.

In the second embodiment the nonmagnetic layer 20 is not located in the first layer 8a of the top shield layer 8 but located between the first layer 8a and the second layer 8b of the top shield layer 8.

According to the manufacturing method of this embodiment, the first layer 8a of the top shield layer 8 is made up of a single layer having a thickness of about 1.0 to 1.5 μm, for example. The nonmagnetic layer 20 is formed on the first layer 8a. The second layer 8b is formed on the nonmagnetic layer 20 and the first layer 8a.

According to the second embodiment, the nonmagnetic layer 20 is located between the first layer 8a and the second layer 8b of the top shield layer 8. As a result, one of the layers formed is omitted from the layers formed in the case in which the nonmagnetic layer 20 is located in the other region. The number of manufacturing steps is thereby reduced.

The remainder of the configuration, functions and effects of the embodiment are similar to those of the first embodiment.

Third Embodiment

Reference is now made to FIG. 10A to FIG. 14A, FIG. 10B to FIG. 14B, and FIG. 15 to describe a thin-film magnetic head and a method of manufacturing the same of a third embodiment of the invention. FIG. 10A to FIG. 14A are cross sections each orthogonal to an air bearing surface. FIG. 10B to FIG. 14B are cross sections of the pole portion each parallel to the air bearing surface.

The steps of the manufacturing method of the third embodiment that are taken until the first layer 8a of the top shield layer 8 is formed are similar to those of the first embodiment, as shown in FIG. 10A and FIG. 10B.

In the following step of the third embodiment, as shown in FIG. 11A and FIG. 11B, the second layer 8b and the third layer 8c of the top shield layer 8 are formed on the first layer 8a, as in the first embodiment. Next, the insulating film 9 of alumina, for example, having a thickness of about 0.3 to 0.6 μm is formed over the entire surface.

Next, a photoresist is patterned through a photolithography process to form a frame (not shown) for making a thin-film coil through frame plating. Next, a first layer 31 of the thin-film coil made of copper, for example, is formed by frame plating through the use of the frame. For example, the thickness of the first layer 31 of the coil is about 1.0 to 2.0 μm and the pitch is 1.2 to 2.0 μm. The frame is then removed. In the drawings numeral 31a indicates a portion for connecting the first layer 31 to a second layer described later.

Next, as shown in FIG. 12A and FIG. 12B, an insulating layer 32 of alumina, for example, having a thickness of about 3 to 4 μm is formed over the entire surface. The insulating layer 32 is then polished through CMP, for example, until the second layer 8b and the third layer 8c of the top shield layer 8 are exposed, and the surface is flattened. Although the first layer 31 of the coil is not exposed in FIG. 12A, the first layer 31 may be exposed.

Next, as shown in FIG. 13A and FIG. 13B, the recording gap layer 12 made of an insulating material whose thickness is 0.2 to 0.3 μm, for example, is formed on the second layer 8b and the third layer 8c of the top shield layer 8 exposed and the insulating layer 32. Next, a portion of the recording gap layer 12 located on top of the third layer 8c is etched to form a contact hole for making the magnetic path.

Next, on the recording gap layer 12, a pole portion layer 41a having a thickness of 2 to 3 μm, for example, is formed. The pole portion layer 41a includes a pole portion of a top pole layer 41 that defines the recording track width. In addition, a magnetic layer 41b having a thickness of 2 to 3 μm is formed in the contact hole provided in the portion on top of the third layer 8c of the top shield layer 8. In this embodiment the top pole layer 41 is made up of the pole portion layer 41a and the magnetic layer 41b and a yoke portion layer described later. The magnetic layer 41b is provided for connecting the top shield layer 8 to the yoke portion layer. In this embodiment the length of the pole portion layer 41a between an end thereof located in the air bearing surface 30 and the other end is greater than the length of the MR element 5 between an end thereof located in the air bearing surface 30 and the other end. Furthermore, this length of the pole portion layer 41a is equal to or greater than the length of the portion of the second layer 8b of the top shield layer 8 that defines the throat height, the length between an end thereof located in the air bearing surface 30 and the other end.

The pole portion layer 41a and the magnetic layer 41b of the top pole layer 41 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Next, the recording gap layer 12 is selectively etched through dry etching, using the pole portion layer 41a as a mask. The dry etching may be reactive ion etching (RIE) using a chlorine-base gas such as $BCl_2$ or $Cl_2$, or a fluorine-base gas such as $CF_4$ or $SF_6$, for example. Next, the second layer 8b of the top shield layer 8 is selectively etched by about 0.3 to 0.6 μm through argon ion milling, for example. A trim structure as shown in FIG. 13B is thus formed.

Next, an insulating film 33 of alumina, for example, having a thickness of about 0.3 to 0.6 μm is formed over the entire surface. Next, portions of the insulating film 33, the recording gap layer 12 and the insulating layer 32 located on top of the connecting portion 31a of the first layer 31 of the coil are etched to form a contact hole. Next, a second layer 34 of the thin-film coil made of copper, for example, is formed by frame plating. For example, the thickness of the second layer 34 is about 1.0 to 2.0 μm and the pitch is 1.2 to 2.0 μm. In the drawings numeral 34a indicates a portion for connecting the second layer 34 to the first layer 31 of the coil through the above-mentioned contact hole.

Figures 14A, 14B:
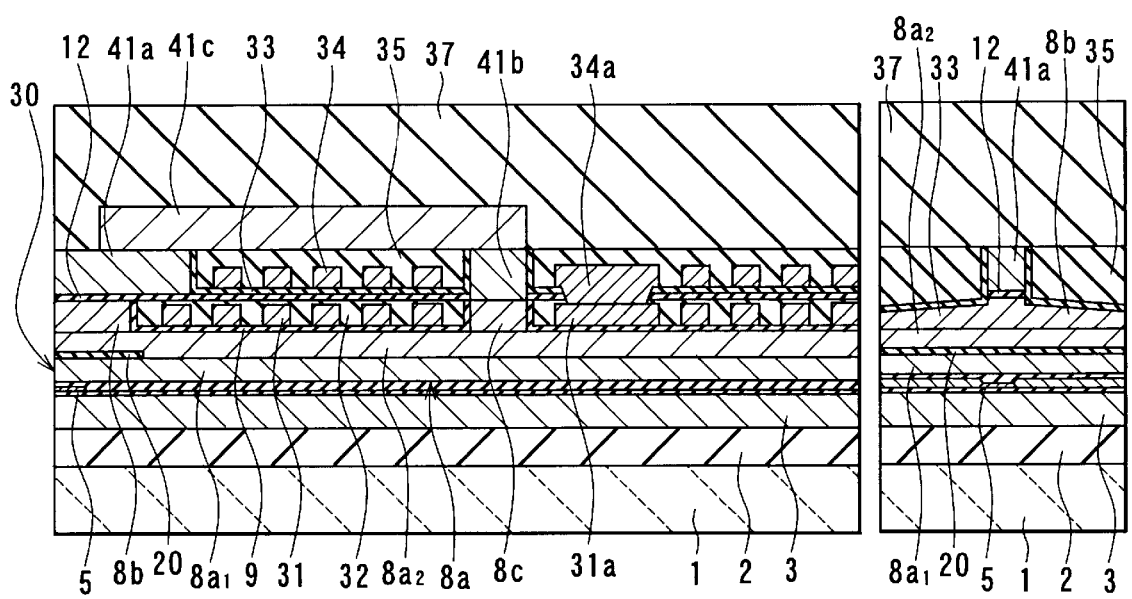
FIG. 14A and FIG. 14B are cross sections of the thin-film magnetic head of the third embodiment.

Next, as shown in FIG. 14A and FIG. 14B, an insulating layer 35 of alumina, for example, having a thickness of about 3 to 4 μm is formed over the entire surface. The insulating layer 35 is then polished through CMP, for example, so that the pole portion layer 41a and the magnetic layer 41b of the top pole layer 41 are exposed, and the surface is flattened. Although the 20 second layer 34 of the thin-film coil is not exposed in FIG. 14A, the second layer 34 may be exposed. If the second layer 34 is exposed, another insulating layer is formed to cover the second layer 34 and the insulating layer 35.

Next, the yoke portion layer 41c having a thickness of about 2 to 3 μm, for example, is formed on the pole portion layer 41a and the magnetic layer 41b of the top pole layer 41 and the insulating layer 35 that are flattened. The yoke portion layer 41c is provided for the recording head and is made of a magnetic material and forms a yoke portion of the top pole layer 41. The yoke portion layer 41c is in contact with and magnetically coupled to the top shield layer 8 through the magnetic layer 41b. The yoke portion layer 41c may be made of NiFe (80 weight % Ni and 20 weight % Fe), or NiFe (45 weight % Ni and 55 weight % Fe) as a high saturation flux density material and formed through plating or may be made of a material such as FeN or FeZrN as a high saturation flux density material through sputtering. Alternatively, a material such as CoFe or a Co-base amorphous material as a high saturation flux density material may be used. To improve the high frequency characteristic, the yoke portion layer 41c may be made of a number of layers of inorganic insulating films and magnetic layers of Permalloy, for example.

In this embodiment an end face of the yoke portion layer 41c facing toward the air bearing surface 30 is located at a distance from the air bearing surface 30 (that is, on the right side of the accompanying cross-sectional views). In this embodiment, in particular, the distance between the air bearing surface 30 and the end of the yoke portion layer 41c facing toward the air bearing surface 30 is equal to or greater the length of the MR element 5 between an end thereof located in the air bearing surface 30 and the other end.

Next, an overcoat layer 37 of alumina, for example, having a thickness of 20 to 40 $\mu$m is formed over the entire surface. The surface of the overcoat layer 37 is then flattened and pads (not shown) for electrodes are formed on the overcoat layer 37. Finally, lapping of the slider including the foregoing layers is performed to form the air bearing surface 30 of the thin-film magnetic head including the recording head and the reproducing head. The thin-film magnetic head of the embodiment is thus completed.

In this embodiment the top pole layer 41 made up of the pole portion layer 41a, the magnetic layer 41b and the yoke portion layer 41c corresponds to the second magnetic layer of the invention.

Figure 15:
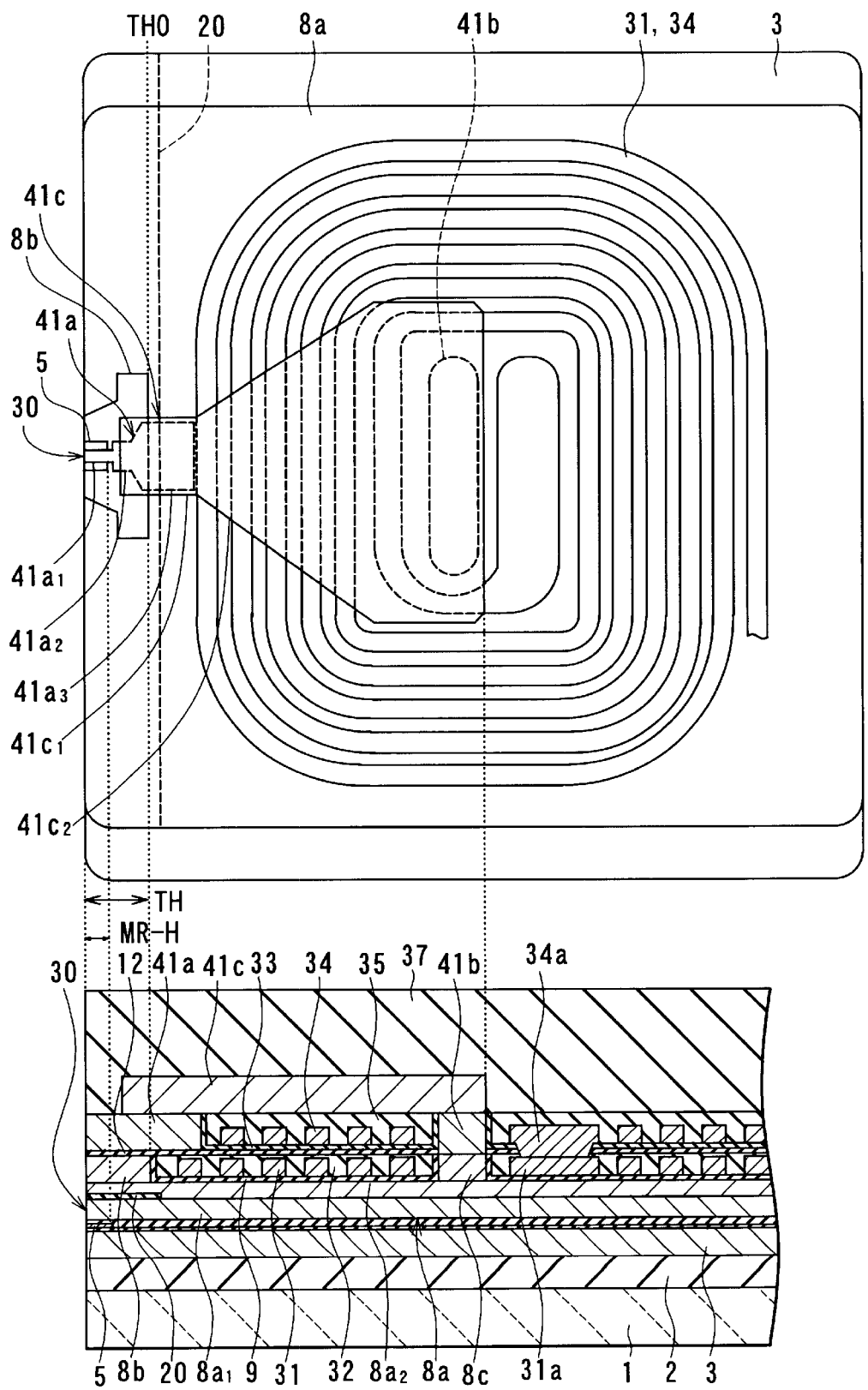
FIG. 15 an explanatory view for illustrating the relationship between a top view of the main part of the thin-film magnetic head of the third embodiment and a cross-sectional view thereof.
Figures 18A, 18B:
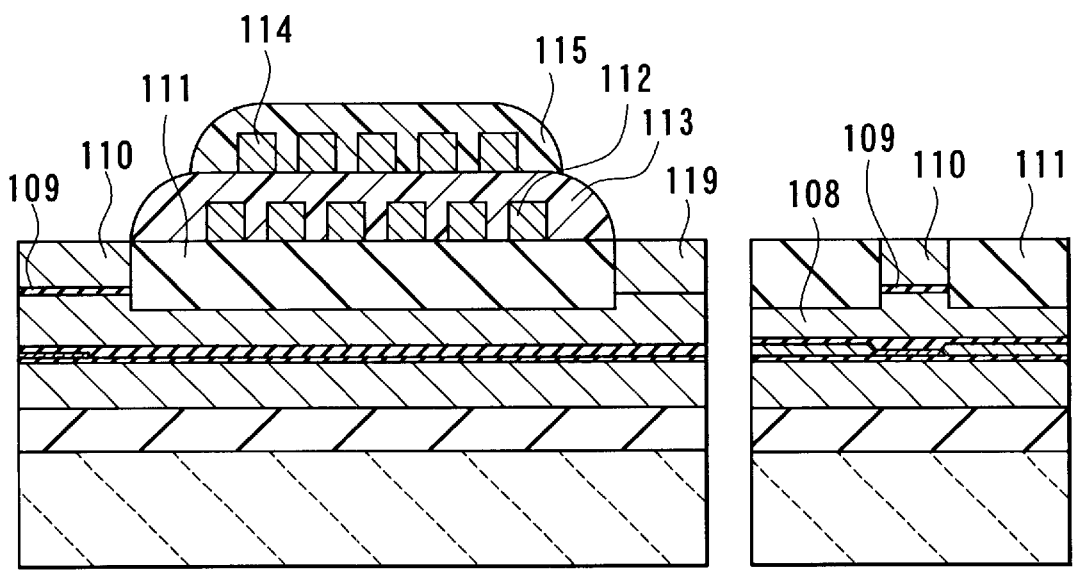
FIG. 18A and FIG. 18B are cross sections for illustrating a step that follows FIG. 17A and FIG. 17B.
Figures 19A, 19B:
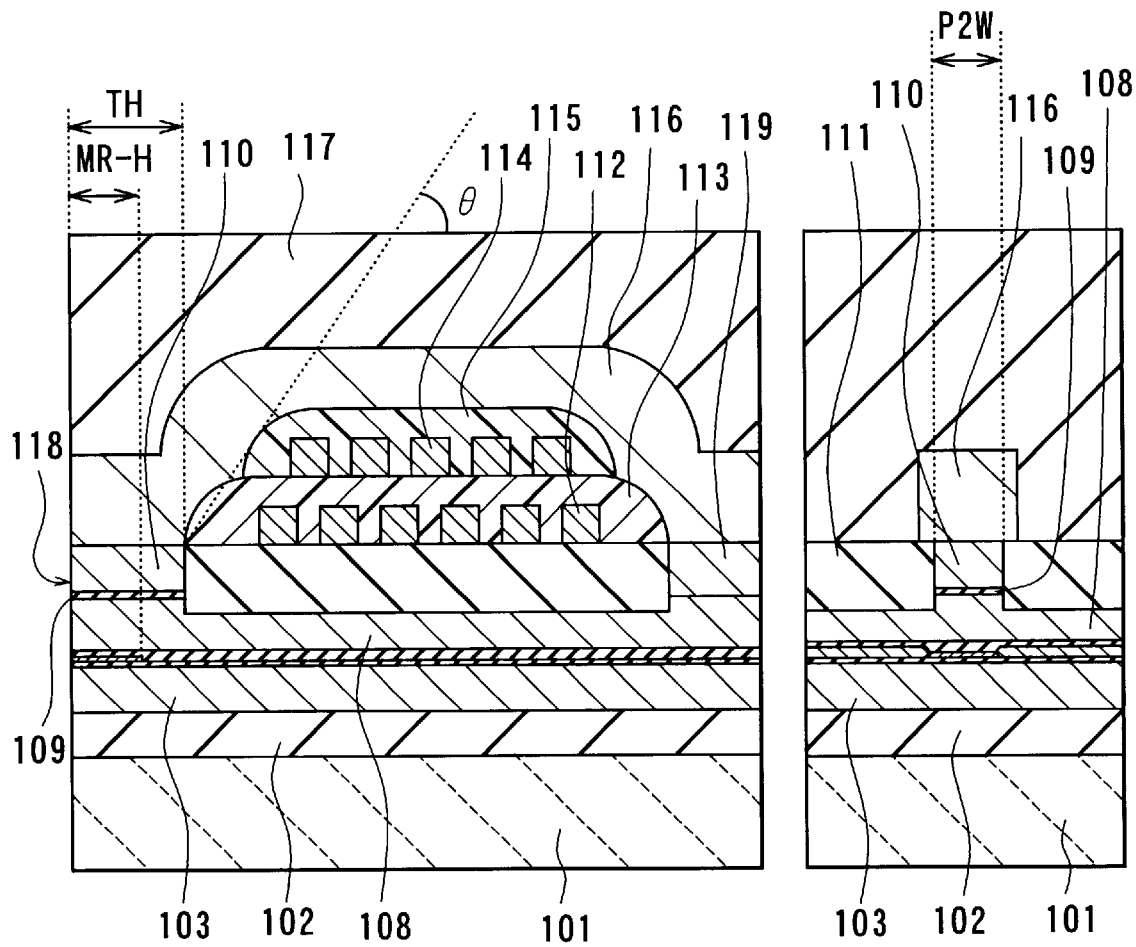
FIG. 19A and FIG. 19B are cross sections for illustrating a step that follows FIG. 18A and FIG. 18B.
Figure 20:
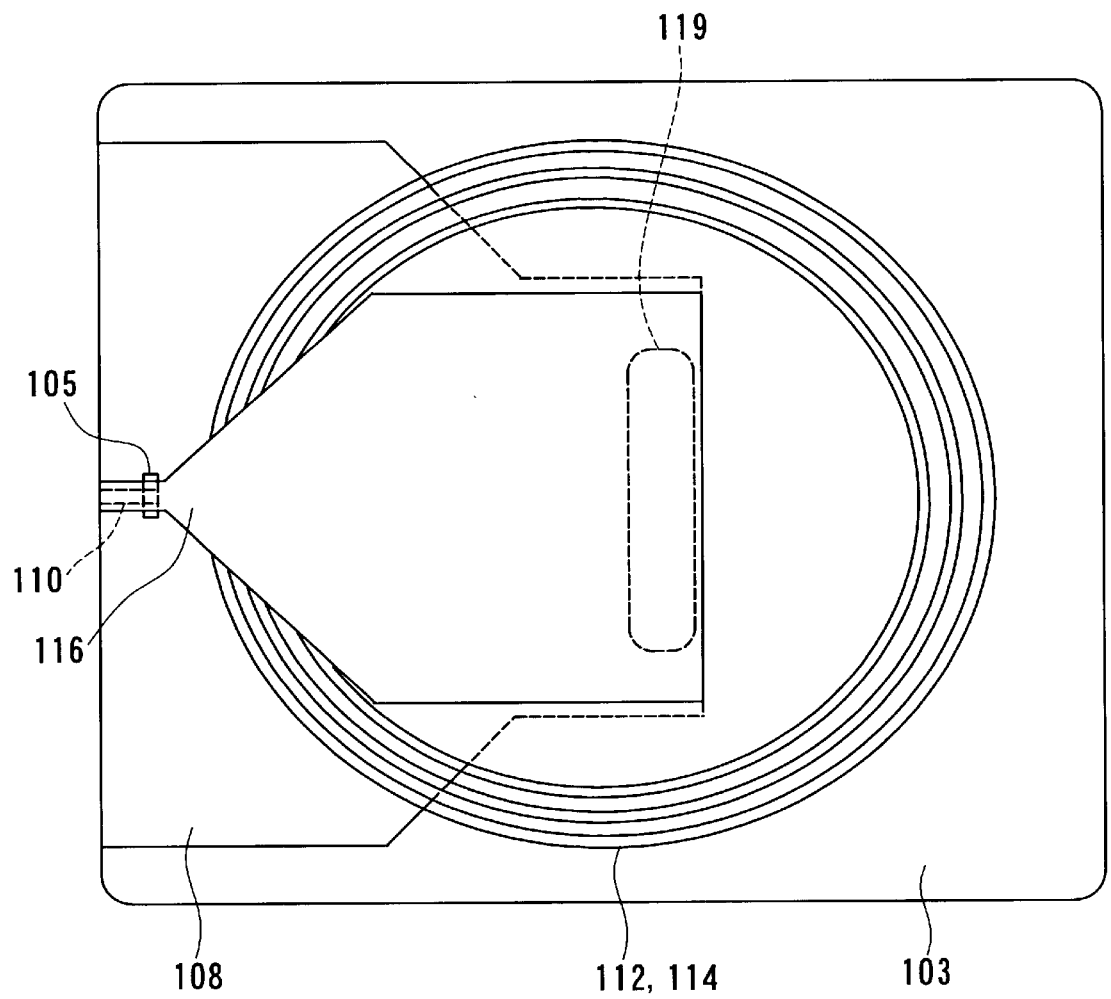
FIG. 20 is a top view of the related-art thin-film magnetic head.

FIG. 15 is an explanatory view for illustrating the relationship between a top view (an upper view of FIG. 15) of the main part of the thin-film magnetic head of the embodiment and a cross-sectional view (a lower view of FIG. 15) thereof. The overcoat layer and the other insulating layers and films are omitted in FIG. 15. In FIG. 15 'TH' indicates the throat height, 'THO' indicates the zero throat height position, and 'MR-H' indicates the MR height.

In this embodiment the first layer 31 of the coil is located on a side of the second layer 8b of the top shield layer 8. In this embodiment throat height TH is the length of the portion of the second layer 8b that defines the throat height, the length between an end of the portion located in the air bearing surface 30 and the other end. (This length may be simply called the length of the second layer 8b in the following description.) As in the first embodiment, throat height TH is greater than MR height MR-H, that is, the length of the MR element 5 between an end thereof located in the air bearing surface 30 and the other end. The length of the second layer 8b is preferably 150 to 600 percent of MR height MR-H, and more preferably 300 to 500 percent. In other words, if MR height MR-H is 0.5 $\mu$m, for example, the length of the second layer 8b is preferably 0.75 to 3.0 $\mu$m, and more preferably 1.5 to 2.5 $\mu$m.

In the embodiment the track width is defined by the pole portion layer 41a of the top pole layer 41. As shown in FIG. 15, the pole portion layer 41a has a first portion $41a_1$, a second portion $41a_2$ and a third portion $41a_3$ in the order in which the closest to the air bearing surface 30 comes first. The first portion $41a_1$ has a width equal to the recording track width. The second portion $41a_2$ is greater than the first portion $41a_2$ in width. The width of the third portion $41a_3$ is equal to the width of the second portion $41a_2$ at the interface between the third portion $41a_3$ and the second portion $41a_2$. The width of the third portion $41a_3$ increases from this interface with an increase in the distance from the air bearing surface 30, and the width finally becomes constant.

The pole portion layer 41a has edges linking lateral edges of the first portion $41a_1$ orthogonal to the air bearing surface 30 to lateral edges of the second portion $41a_2$ orthogonal to the air bearing surface 30. These edges linking the lateral edges of the first portion $41a_1$ to the lateral edges of the second portion $41a_2$ are parallel to the air bearing surface 30.

In the pole portion layer 41a the interface between the first portion $41a_1$ and the second portion $41a_2$ is located near the zero MR height position.

In the pole portion layer 41a the interface between the second portion $41a_2$ and the third portion $41a_3$ is located closer to the air bearing surface 30 than zero throat height position THO, that is, the position of an end of the portion of the second layer 8b that faces toward the pole portion layer 41a, the end opposite to the air bearing surface 30. As a result, in this embodiment, the width of the pole portion layer 41a at zero throat height position THO is greater than the recording track width, that is, the width of the first portion $41a_1$.

The yoke portion layer 41c of the top pole layer 41 has a first portion $41c_1$ and a second portion $41c_2$ in the order in which the closest to the air bearing surface 30 comes first. The first portion $41c_1$ has a width nearly equal to the greatest width of the third portion $41a_3$ of the pole portion layer 41a. The width of the second portion $41c_2$ is equal to the width of the first portion $41c_1$ at the interface between the first portion $41c_1$ and the second portion $41c_2$. The width of the second portion $41c_2$ increases from this interface with an increase in the distance from the air bearing surface 30, and the width finally becomes constant. The first portion $41c_1$ is located so as to be laid nearly over the second portion $41a_2$ and the third portion $41a_3$ of the pole portion layer 41a.

The second layer 8b of the top shield layer 8 of this embodiment has a portion on a side of the air bearing surface 30. This portion has a width smaller than the width of the other portion of the second layer 8b, and this width of the second layer 8b decreases as the distance from the air bearing surface 30 decreases. An end of the second layer 8b farther from the air bearing surface 30 has the shape of a straight line parallel to the air bearing surface 30. This end of the second layer 8b is located in zero throat height position THO.

According to the embodiment thus described, the throat height is defined by the second layer 8b of the top shield layer 8. The first layer 31 of the thin-film coil is located on the first layer 8a of the top shield layer 8 and on a side of the second layer 8b. The top surface of the insulating layer 32 covering the first layer 31 is flattened, together with the top surface of the second layer 8b. In addition, the top pole layer 41 is divided into the pole portion layer 41a and the yoke portion layer 41c. As a result, the pole portion layer 41a of the top pole layer 41 that defines the recording track width is formed on the flat surface. Therefore, according to the embodiment, it is possible to form the pole portion layer 41a with accuracy and to precisely control the recording track width even if the recording track width is reduced down to the half-micron or quarter-micron order.

According to the embodiment, the width of the pole portion layer 41a at the zero throat height position is greater than the recording track width. It is thereby possible to prevent a magnetic flux from saturating in the pole portion layer 41a in the neighborhood of the zero throat height position. In addition, the width of the pole portion layer 41a gradually decreases toward the air bearing surface 30. Therefore, it is impossible that the cross-sectional area of the magnetic path abruptly decreases. Saturation of a magnetic flux halfway through the magnetic path is thereby prevented. Furthermore, the width of the pole portion layer 41a at the zero throat height position is greater than the recording track width. As a result, the areas of the pole portion layer 41a and the yoke portion layer 41c touching each other are increased. It is thereby possible to prevent a magnetic flux from saturating in the portions of the pole portion layer 41a and the yoke portion layer 41c touching each other. According to the embodiment, it is thereby possible to utilize the magnetomotive force generated by the layers 31 and 34 of the coil for writing with efficiency and to improve the overwrite property.

According to the embodiment, the pole portion layer 41a that defines the recording track width is formed on the flat surface. As a result, it is possible to prevent an increase in the width of the first portion 41a, that defines the recording track width when the width of the pole portion layer 41a at the zero throat height position is made greater than the recording track width as described above.

In the embodiment an end of the second portion $41a_2$ of the pole portion layer 41a on a side of the air bearing surface 30 is parallel to the air bearing surface 30. The first portion $41a_1$ of the pole portion layer 41a is coupled to this end of the second portion $41a_2$. Therefore, a photomask used for making the pole portion layer 41a through photolithography has a shape including a side corresponding to the end of the second portion $41a_2$ on the side of the air bearing surface 30 and an additional concave or convex portion corresponding to the first portion $41a_1$. The pole portion layer 41a is formed on the flat surface through the use of the photomask in the above-described shape. It is thereby possible to precisely control the width of the first portion $41a_1$, that is, the recording track width.

In the embodiment the second layer 34 of the thin-film coil is located on a side of the pole portion layer 41a of the top pole layer 41. The top surface of the insulating layer 35 covering the second layer 34 is flattened, together with the top surface of the pole portion layer 41a. As a result, the yoke portion layer 41c of the top pole layer 41 is formed on the flat surface, too. It is thereby possible to form the yoke portion layer 41c of small dimensions. It is thus possible to prevent 'side write', that is, data is written in a region of a recording medium where data is not supposed to be written, or 'side erase' that is, data is erased in a region where data is not supposed to be written.

In the embodiment an end face of the yoke portion layer 41c facing toward the air bearing surface 30 is located at a distance from the air bearing surface 30. As a result, it is impossible that the yoke portion layer 41c is exposed from the air bearing surface 30 even if the throat height is low. Side write and side erase are thereby prevented.

According to the embodiment, the length of the pole portion layer 41a between an end thereof facing toward the air bearing surface 30 and the other end is greater than the MR height, that is, the length of the MR element 5 between the end thereof located in the air bearing surface 30 and the other end. In addition, the end face of the yoke portion layer 41c facing toward the air bearing surface 30 is located at a distance from the air bearing surface 30. Therefore, portions of the pole portion layer 41a and the yoke portion layer 41c are allowed to touch each other in the region farther from the air bearing surface 30 than the zero MR height position, too.

As a result, according to the embodiment, side write and side erase are prevented since the end face of the yoke portion layer 41c facing toward the air bearing surface 30 is located at a distance from the air bearing surface 30. At the same time, it is possible to prevent an abrupt decrease in the cross-sectional area of the magnetic path in the top pole layer 41 and to prevent a magnetic flux from saturating halfway through the magnetic path.

In the embodiment the distance between the air bearing surface 30 and the end of the yoke portion layer 41c facing toward the air bearing surface 30 is equal to or greater than the MR height, that is, the length of the MR element 5 between an end thereof located in the air bearing surface 30 and the other end. It is thereby possible to prevent side write and side erase more effectively.

According to the embodiment, since the second layer 8b of the top shield layer 8 has the geometry as described above, it is possible to reduce the width of the second layer 8b in the air bearing surface 30 and to prevent an increase in effective track width. In addition, the width of the second layer 8b gradually decreases toward the air bearing surface 30. It is thereby possible to prevent a magnetic flux from saturating in the second layer 8b.

Furthermore, it is possible to precisely control the throat height and the zero throat height position since the end of the second layer 8b opposite to the air bearing surface 30 has the shape of a straight line parallel to the air bearing surface 30.

According to the embodiment, the insulating film 33 made of an inorganic material is provided between the first layer 31 and the second layer 34 of the thin-film coil, in addition to the recording gap layer 12. High insulation strength is thereby obtained between the first layer 31 and the second layer 34 of the coil. In addition, it is possible to reduce flux leakage from the layers 31 and 34 of the coil.

In this embodiment the nonmagnetic layer 20 may be located between the first layer 8a and the second layer 8b of the top shield layer 8, instead of in the first layer 8a.

The remainder of the configuration, functions and effects of the embodiment are similar to those of the first embodiment.

The present invention is not limited to the foregoing embodiments but may be practiced in still other ways. For example, the invention may be applied to a case wherein the top shield layer does not have the second layer including the pole portion.

In the foregoing embodiments, the thin-film magnetic head is disclosed, comprising the MR element for reading formed on the base body and the induction-type magnetic transducer for writing stacked on the MR element. Alternatively, the MR element may be stacked on the magnetic transducer.

That is, the induction-type magnetic transducer for writing may be formed on the base body and the MR element for reading may be stacked on the transducer. Such a structure may be achieved by forming a magnetic film functioning as the top pole layer of the foregoing embodiments as a bottom pole layer on the base body, and forming a magnetic film functioning as the bottom pole layer of the embodiments as a top pole layer facing the bottom pole layer with a recording gap film in between. In this case it is preferred that the top pole layer of the induction-type magnetic transducer functions as the bottom shield layer of the MR element, too.

According to the thin-film magnetic head or the method of manufacturing the same of the invention thus described, the nonmagnetic layer is provided in the second shield layer and between the magnetoresistive element and the pole portion of the second shield layer. The nonmagnetic layer reduces the effect of residual magnetism produced in the recording head on the magnetoresistive element. It is thereby possible to reduce noise and variations in output of the reproducing head resulting from the writing operation of the recording head.

According to the thin-film magnetic head or the method of manufacturing the same of the invention, the second shield layer may include: the first layer located to face at least a part of the coil; and the second layer including one of the pole portions and connected to a surface of the first layer that faces the gap layer. In this case, the nonmagnetic layer may be located between the first layer and the second layer. As a result, it is possible that the number of manufacturing steps is smaller than that of the case in which the nonmagnetic layer is provided in any other region.

According to the thin-film magnetic head or the method of manufacturing the same of the invention, the second layer may include the portion for defining the throat height. As a result, it is possible that the track width is controlled with accuracy by the second magnetic layer even if the throat height is low.

According to the thin-film magnetic head or the method of manufacturing the same of the invention, the portion for defining the throat height may have a length between an end thereof located in the medium facing surface and the other end, the length being greater than the length of the nonmagnetic layer between an end thereof located in the medium facing surface and the other end. As a result, it is possible to prevent a magnetic flux from saturating in the portion where the first and second layers of the second shield layer are connected to each other.

According to the thin-film magnetic head or the method of manufacturing the same of the invention, the thin-film coil may include the portion located on a side of the second layer. As a result, the second magnetic layer is formed on the flat surface with accuracy. It is thereby possible to control the track width of the recording head with accuracy. Furthermore, it is possible that an end of the portion of the coil located on the side of the second layer is located near an end of the second layer. It is thereby possible to reduce the yoke length.

According to the thin-film magnetic head or the method of manufacturing the same of the invention, the insulating layer may be further provided. This insulating layer covers the portion of the thin-film coil located on the side of the second layer, wherein a surface of the insulating layer facing toward the gap layer is flattened together with a surface of the second layer facing toward the gap layer. It is thereby possible to form the second magnetic layer on the flat surface with accuracy.

According to the thin-film magnetic head or the method of manufacturing the same of the invention, the second magnetic layer may include: the pole portion layer including one of the pole portions that defines the track width; and the yoke portion layer forming the yoke portion and connected to the pole portion layer. In addition, the yoke portion layer may have an end face that faces toward the medium facing surface, the end face being located at a distance from the medium facing surface. As a result, it is possible to prevent writing data in a region of a recording medium where data is not supposed to be written, and to prevent erasing data in a region where data is not supposed to be written.

According to the thin-film magnetic head or the method of manufacturing the same of the invention, the pole portion layer may have a length between an end thereof located in the medium facing surface and the other end, the length being greater than a length of the magnetoresistive element between an end thereof located in the medium facing surface and the other end. As a result, it is possible to prevent a magnetic flux from saturating in the portion in which the pole portion layer is connected to the yoke portion layer.

According to the thin-film magnetic head or the method of manufacturing the same of the invention, the thin-film coil may include the portion located on a side of the pole portion layer. In this case, the insulating layer may be further provided. This insulating layer covers the portion of the coil located on the side of the pole portion layer and has a surface facing toward the yoke portion layer, the surface being flattened together with a surface of the pole portion layer facing toward the yoke portion layer. It is thereby possible to form the yoke portion layer of the second magnetic layer on the flat surface with accuracy.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a reproducing head including: a magnetoresistive element; and a first shield layer and a second shield layer for shielding the magnetoresistive element, portions of the shield layers located on a side of the medium facing surface being opposed to each other with the magnetoresistive element in between; and
   a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers;
   the second shield layer functioning as the first magnetic layer, too,
   the thin-film magnetic head further comprising a nonmagnetic layer that is embedded in the second shield layer and located between the magnetoresistive element and the pole portion of the second shield layer, the nonmagnetic layer having an area smaller than an area of the second shield layer and greater than an area of the magnetoresistive element.

2. The thin-film magnetic head according to claim 1 wherein the second shield layer includes: a first layer located to face toward the at least part of the coil; and a second layer including one of the pole portions and connected to a surface of the first layer that faces toward the gap layer.

3. The thin-film magnetic head according to claim 2 wherein the nonmagnetic layer is located between the first layer and the second layer.

4. The thin-film magnetic head according to claim 2 wherein the second layer includes a portion for defining a throat height.

5. The thin-film magnetic head according to claim 4 wherein the portion for defining the throat height has a length between an end thereof located in the medium facing surface and the other end, the length being greater than a length of the nonmagnetic layer between an end thereof located in the medium facing surface and the other end.

6. The thin-film magnetic head according to claim 2 wherein the thin-film coil includes a portion located on a side of the second layer.

7. The thin-film magnetic head according to claim 6, further comprising an insulating layer that covers the portion of the thin-film coil located on the side of the second layer, wherein a surface of the insulating layer facing toward the gap layer is flattened together with a surface of the second layer facing toward the gap layer.

8. The thin-film magnetic head according to claim 1 wherein the second magnetic layer is made up of one layer.

9. The thin-film magnetic head according to claim 1 wherein the second magnetic layer includes: a pole portion layer including one of the pole portions that defines a track width; and a yoke portion layer making up a yoke portion and connected to the pole portion layer.

10. The thin-film magnetic head according to claim 9 wherein the yoke portion layer has an end face that faces toward the medium facing surface, the end face being located at a distance from the medium facing surface.

11. The thin-film magnetic head according to claim 9 wherein the pole portion layer has a length between an end thereof located in the medium facing surface and the other end, the length being greater than a length of the magnetoresistive element between an end thereof located in the medium facing surface and the other end.

12. The thin-film magnetic head according to claim 9 wherein the thin-film coil includes a portion located on a side of the pole portion layer.

13. The thin-film magnetic head according to claim 12, further comprising an insulating layer that covers the portion of the coil located on the side of the pole portion layer and has a surface facing toward the yoke portion layer, the surface being flattened together with a surface of the pole portion layer facing toward the yoke portion layer.

14. A method of manufacturing a thin-film magnetic head comprising:
a medium facing surface that faces toward a recording medium;
a reproducing head including: a magnetoresistive element; and a first shield layer and a second shield layer for shielding the magnetoresistive element, portions of the shield layers located on a side of the medium facing surface being opposed to each other with the magnetoresistive element in between; and
a recording head including: a first magnetic layer and a second magnetic layer magnetically coupled to each other and including magnetic pole portions opposed to each other and placed in regions of the magnetic layers on a side of the medium facing surface, each of the magnetic layers including at least one layer; a gap layer provided between the pole portions of the first and second magnetic layers; and a thin-film coil at least a part of which is placed between the first and second magnetic layers, the at least part of the coil being insulated from the first and second magnetic layers;
the second shield layer functioning as the first magnetic layer, too; the method including the steps of:
forming the reproducing head;
forming the recording head; and
forming a nonmagnetic layer that is embedded in the second shield layer and located between the magnetoresistive element and the pole portion of the second shield layer, the nonmagnetic layer having an area smaller than an area of the second shield layer and greater than an area of the magnetoresistive element.

15. The method according to claim 14 wherein:
the step of forming the reproducing head includes the step of forming the second shield layer; and
the step of forming the second shield layer includes the steps of: forming a first layer located to face toward the at least part of the coil; and forming a second layer including one of the pole portions and connected to a surface of the first layer that faces toward the gap layer.

16. The method according to claim 15 wherein the nonmagnetic layer is located between the first layer and the second layer in the step of forming the nonmagnetic layer.

17. The method according to claim 15 wherein the second layer is formed to include a portion for defining a throat height.

18. The method according to claim 17 wherein the portion for defining the throat height is made to have a length between an end thereof located in the medium facing surface and the other end; the length being greater than a length of the nonmagnetic layer between an end thereof located in the medium facing surface and the other end.

19. The method according to claim 15 wherein the thin-film coil is formed to include a portion located on a side of the second layer.

20. The method according to claim 19, further including the step of forming an insulating layer that covers the portion of the thin-film coil located on the side of the second layer, wherein a surface of the insulating layer facing toward the gap layer is flattened together with a surface of the second layer facing toward the gap layer.

21. The method according to claim 14 wherein the second magnetic layer is made up of one layer.

22. The method according to claim 14 wherein:
the step of forming the recording head includes the step of forming the second magnetic layer; and
the step of forming the second magnetic layer includes the steps of: forming a pole portion layer including one of the pole portions that defines a track width; and forming a yoke portion layer making up a yoke portion and connected to the pole portion layer.

23. The method according to claim 22 wherein the yoke portion layer is formed to have an end face that faces toward the medium facing surface, the end face being located at a distance from the medium facing surface in the step of forming the yoke portion layer.

24. The method according to claim 22 wherein the pole portion layer is made to have a length between an end thereof located in the medium facing surface and the other end, the length being greater than a length of the magnetoresistive element between an end thereof located in the medium facing surface and the other end.

25. The method according to claim 22 wherein the thin-film coil is formed to include a portion located on a side of the pole portion layer.

26. The method according to claim 25, further including the steps of forming an insulating layer that covers the portion of the coil located on the side of the pole portion layer and has a surface facing toward the yoke portion layer, the surface being flattened together with a surface of the pole portion layer facing toward the yoke portion layer.

* * * * *